United States Patent [19]

van Weenen

[11] Patent Number: 4,469,494
[45] Date of Patent: Sep. 4, 1984

[54] DISC OPERATED GAS PURIFICATION SYSTEM

[75] Inventor: Willem F. van Weenen, Los Angeles, Calif.

[73] Assignee: Kinetics Technology International Corporation, Monrovia, Calif.

[21] Appl. No.: 462,134

[22] Filed: Jan. 31, 1983

[51] Int. Cl.³ ............................................. B01D 53/04
[52] U.S. Cl. .......................................... 55/179; 55/387
[58] Field of Search .................. 55/161, 179–181, 55/387, 389

[56] References Cited

U.S. PATENT DOCUMENTS

| | | | |
|---|---|---|---|
| 1,387,857 | 8/1921 | McKee | 55/179 X |
| 1,602,500 | 10/1926 | Nuss | 55/181 X |
| 2,204,431 | 6/1940 | Moore et al. | 55/179 |
| 2,706,532 | 4/1955 | Ringo et al. | 55/180 |
| 2,751,034 | 6/1956 | Ringo et al. | 55/180 |
| 3,231,492 | 1/1966 | Stine et al. | 55/179 X |
| 3,268,604 | 8/1966 | Boyd, Jr. | 55/387 X |
| 4,038,054 | 7/1977 | Graff | 55/179 |
| 4,209,308 | 6/1980 | Blodgett | 55/179 |
| 4,315,759 | 2/1982 | Benkmann | 55/387 X |

FOREIGN PATENT DOCUMENTS

| | | | |
|---|---|---|---|
| 1062676 | 8/1959 | Fed. Rep. of Germany | 55/179 |
| 102638 | 9/1941 | Sweden | 55/179 |
| 393586 | 6/1933 | United Kingdom | 55/179 |
| 784150 | 10/1957 | United Kingdom | 55/179 |
| 871242 | 6/1961 | United Kingdom | 55/179 |

Primary Examiner—Robert H. Spitzer
Attorney, Agent, or Firm—William W. Haefliger

[57] ABSTRACT

A system for purifying hydrogen rich gas, or other gases, employs a control vessel incorporating structure including rotary means operating in conjunction with satellite adsorber vessels, for controlling adsorption, de-pressurization, purging and re-pressurization.

11 Claims, 24 Drawing Figures

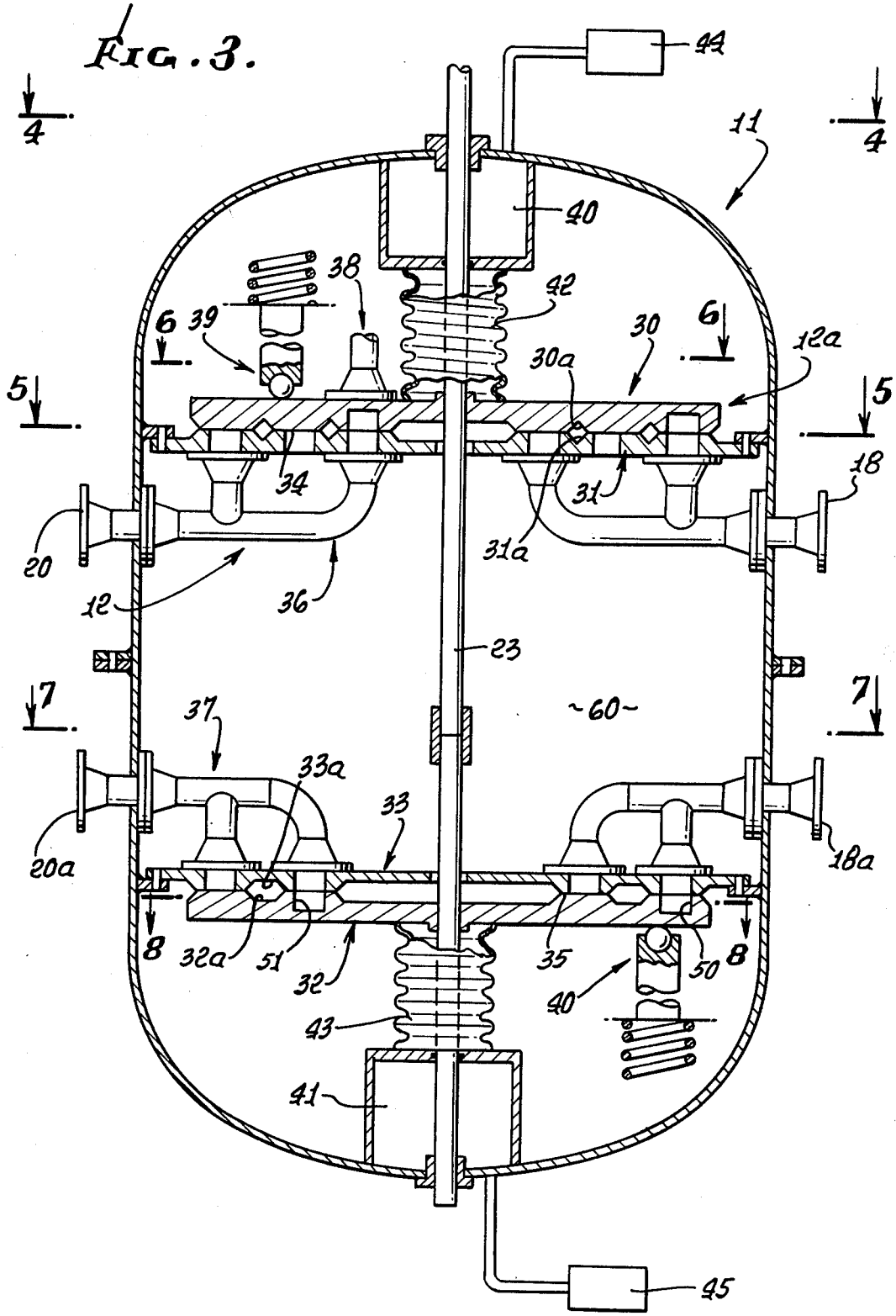

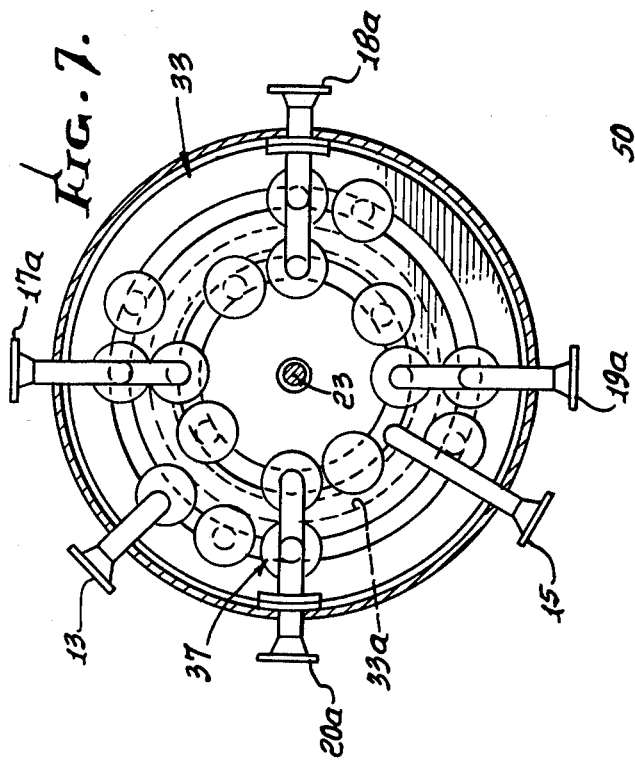
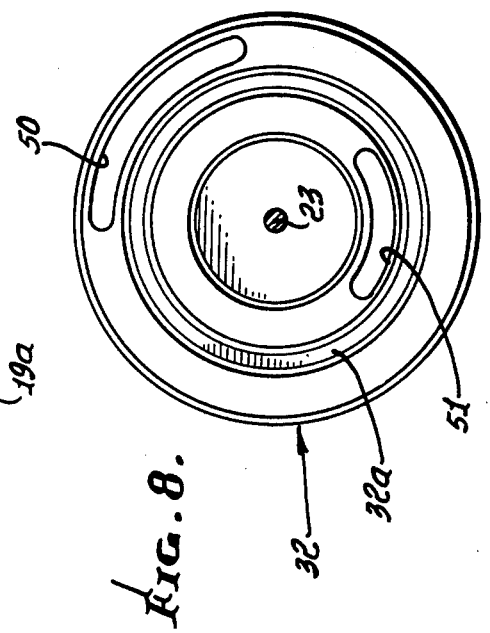
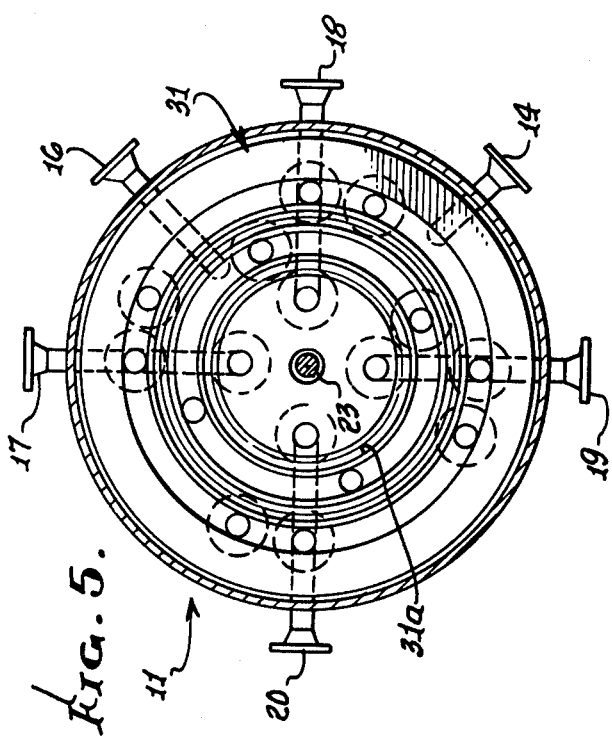
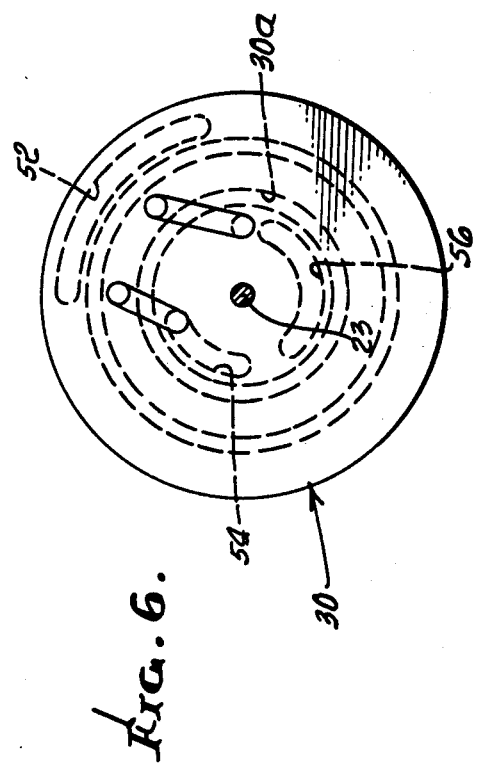

Fig. 10a.
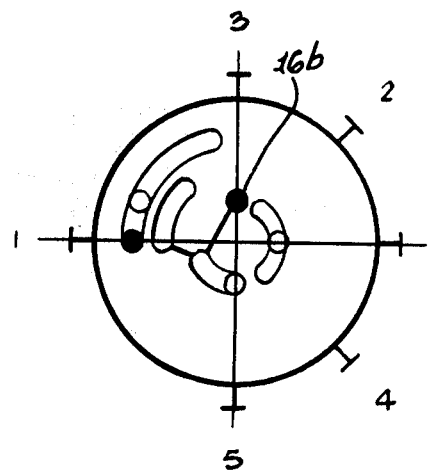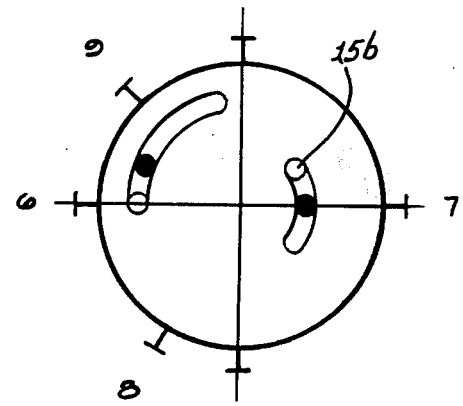
Fig. 10b.
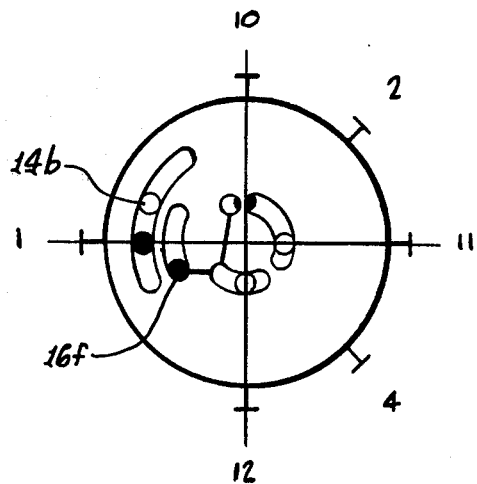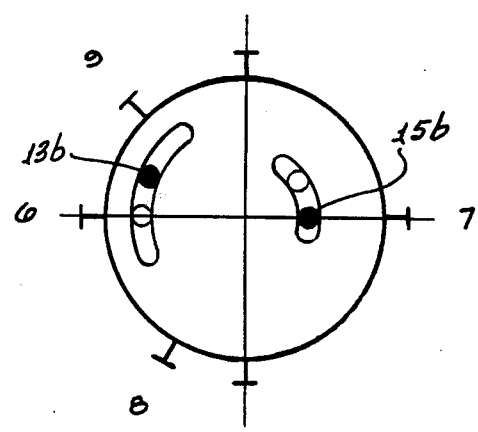

FIG. 11a.
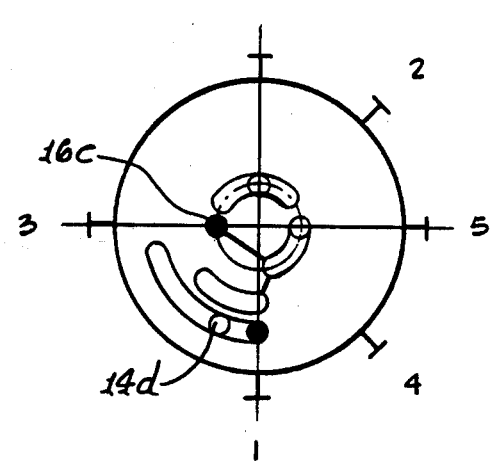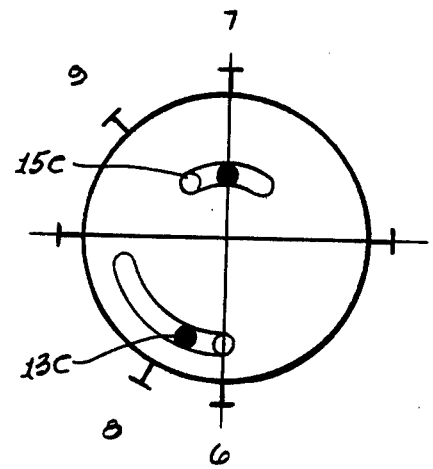
FIG. 11b.
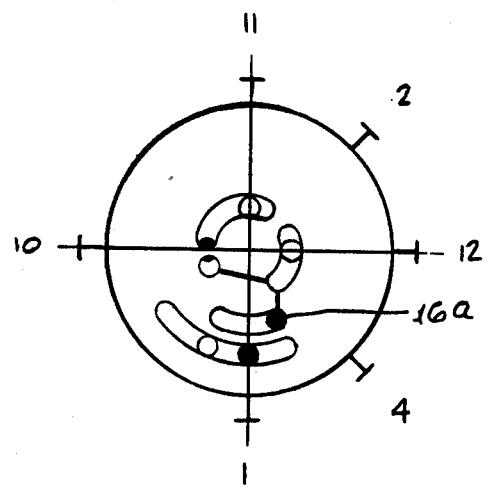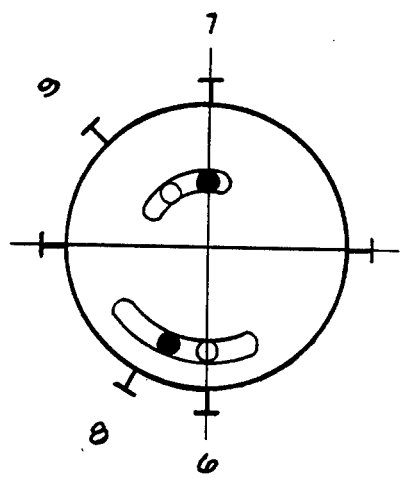

DISC OPERATED GAS PURIFICATION SYSTEM

BACKGROUND OF THE INVENTION

This invention relates generally to gas treatment, and more specifically to purification of a gas stream such as a stream of hydrogen containing impurities.

A known (Pressure Swing Adsorption) gas purification system follows a cycle consisting of adsorption, stepwise depressurization, purging, and stepwise repressurization. In that system, hydrogen recovery is on the order of 75 to 85 percent, depending on the number of adsorbers, and hydrogen recovery is optimized by effectively utilizing the hydrogen stored in the adsorber vessel at the end of the cycle to repressurize other adsorber vessels and to provide hydrogen for purging. One vessel is on adsorption at any one time while the others are in various stages of regeneration. The cycles are staggered so that one adsorber at a time comes on the line when another completes its adsorption step. At the end of an adsorption cycle, the vessel is depressurized in a cocurrent direction in four steps—three separate pressure equalization steps with three different adsorbers and a purge step with a fourth. During this depressurization, only pure hydrogen is removed. Following the concurrent depressurization, further depressurization is carried out in a countercurrent direction, with the removal of some impurities. The adsorber is then purged at low pressure with pure hydrogen. The gases from the final depressurization step and purge step go to fuel.

More specifically, the P.S.A. system operates approximately as follows: A gas containing hydrogen 70%, carbon dioxide 20%, carbon monoxide 4%, methane 2% and the balance nitrogen is passed through the first absorbent vessels at a pressure of approximately 180 to 300 psig at 100°–110° F. Under these conditions, all of the components of the gas with the exception of hydrogen are strongly adsorbed by the solid granular material contained in the vessel. The pure hydrogen leaving the vessel passes through a valve system to the product line. After a short period of time the adsorbent becomes saturated with the various impurities and the incoming gas is switched to a second adsorbent field vessel where the process continues. In the meantime, the first vessel is connected through valve systems to other vessels in the train and the pressure reduced rapidly to permit expulsion of the adsorbed impurities. Up to ten vessels have been utilized in systems of this kind with the interconnecting valve train containing 20 to 40 elements.

It can be seen that the P.S.A. process is mechanically complex, and requires extensive valving and piping, which is unduly costly.

SUMMARY OF THE INVENTION

It is a major object of the invention to provide a much simplified and less costly system for purifying hydrogen rich gas, and also usable or operable in conjunction with treatment of other gases.

Basically, the new system employs a control vessel incorporating structure including rotary means operating in conjunction with satellite adsorber vessels, for controlling adsorption, de-pressurization, purging and re-pressurization, as will appear. In its fundamental aspects, the system directs the flow of the following gases:

(i) feed gas
(ii) product gas
(iii) purge gas, and
(iv) re-pressurization gas between multiple vessels, as for example four vessels V-I-V-IV containing adsorber for components of the feed other than the product gas; and the system includes:

(a) a control vessel containing structure including rotor means defining gas passages communicable with control vessel ports for the (i)–(iv) gases and selectively communicable with vessel inlet and outlet ports that communicate with the vessels V-I-V-IV, (b) means to rotate the rotor means to communicate the gas passages in said structure and rotor means successively with the vessels so that feed gas is passed from the rotor means successively to said vessels, product gas is received by the rotor means successively from the vessels, purge gas is received by the rotor means successively from the vessels, and re-pressurization gas is passed from the rotor means successively to said vessels.

Typically, the structure and rotary means includes primary relatively rotatable members and containing passages to control the flow of two of said (i)–(iv) gases, and secondary relatively rotatable members containing passages to control the flow of another two of said (i)–(iv) gases. Thus, the passages of the primary members may control the flow of the (i) and (iii) gas streams; and the passages of the secondary members may control the flow of the (ii) and (iv) gas streams. Such members may comprise relatively rotatable discs, as for example two pairs of disc, one disc of each pair being fixed, and the other rotatable in face-to-face sliding engagement with the fixed disc, the passages in the discs communicating with the control vessel ports for the gas streams as referred to.

These and other objects and advantages of the invention, as well as the details of an illustrative embodiment, will be more fully understood from the following specification and drawings, in which:

DRAWING DESCRIPTION

FIG. 3 is a side elevation in section showing details of a control vessel containing gas flow directing rotor means;

Figure 4:
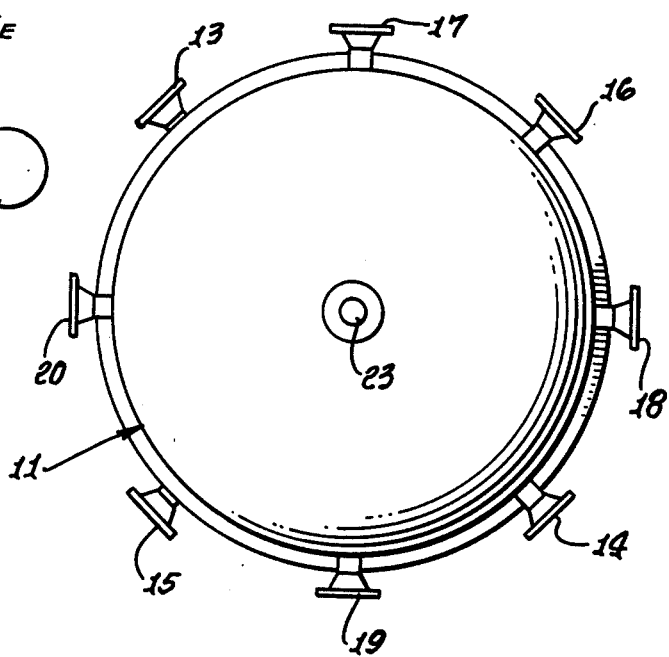
Figure 9A:
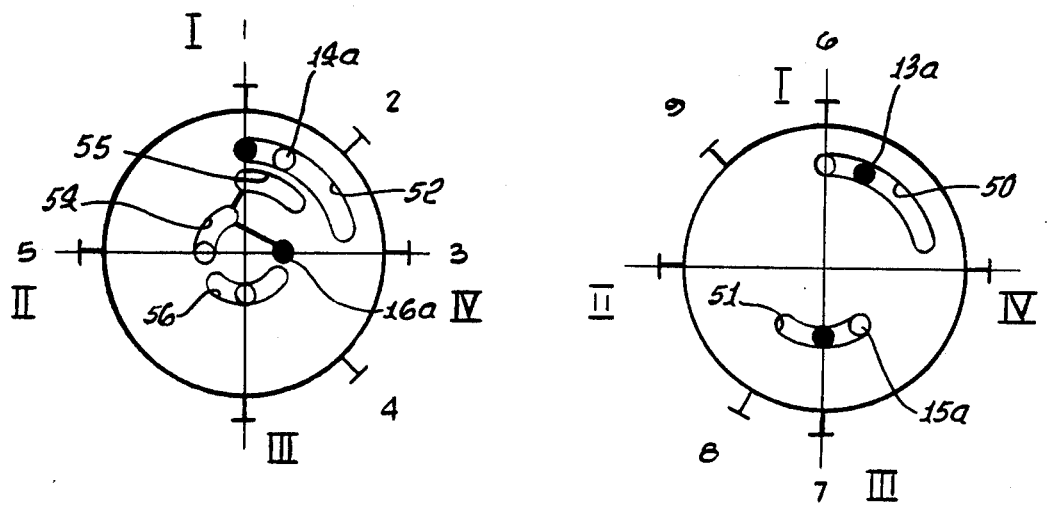
Figure 9B:
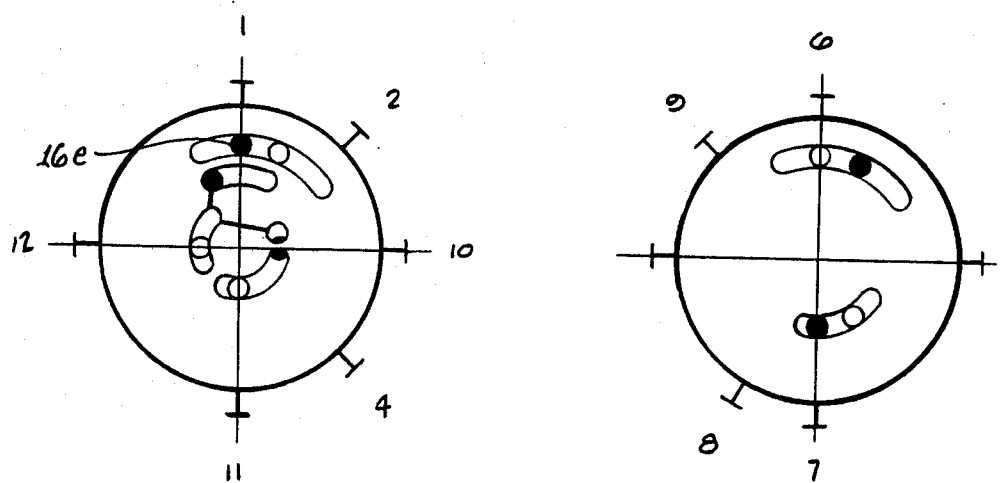
Figure 9C:
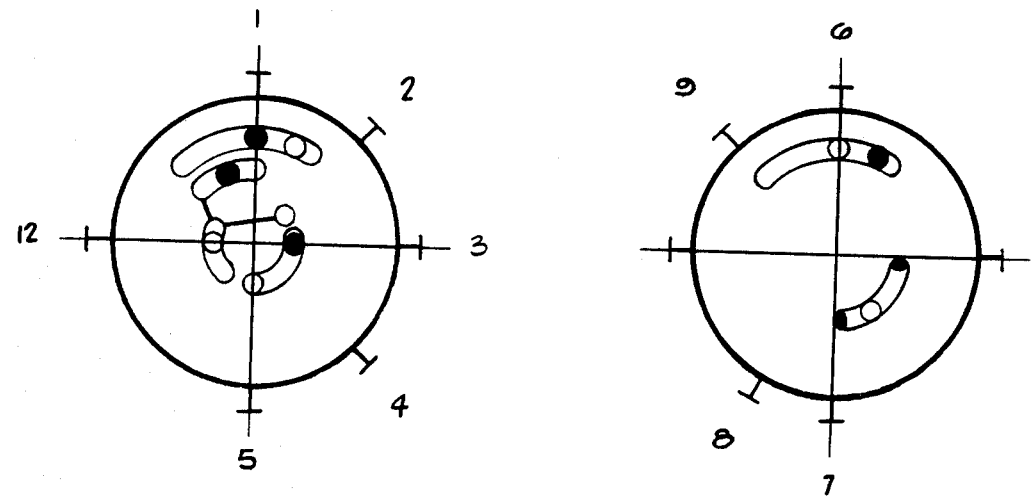
Figure 9D:
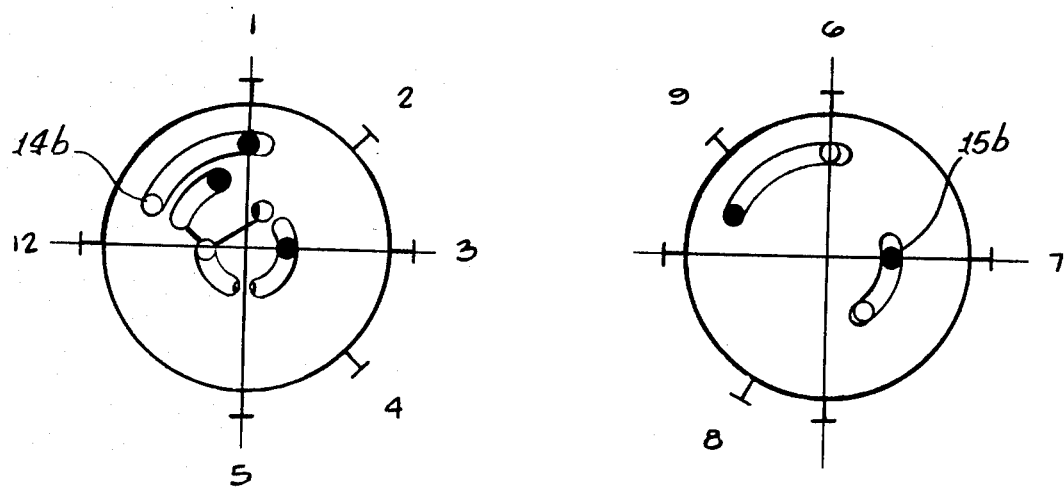

FIG. 4 is a plan view taken on lines 4—4 of FIG. 3;
FIG. 5 is a section taken on lines 5—5 of FIG. 3;
FIG. 6 is a section taken on lines 6—6 of FIG. 3;
FIG. 7 is a section taken on lines 7—7 of FIG. 3;
FIG. 8 is a section taken on lines 8—8 of FIG. 3; and FIGS. 9a–9d are schematic showings of upper and lower rotor positions during a first quarter cycle of rotor rotation;

FIGS. 10a–10d are schematic showings of upper and lower rotor positions during a second quarter cycle of rotor rotation;

FIGS. 11a–11d are schematic showings of upper and lower rotor positions during a third quarter cycle of rotor rotation; and FIGS. 12a–12d are schematic showings of upper and lower rotor positions during a fourth quarter cycle of rotor rotation.

DETAILED DESCRIPTION

Figure 1:
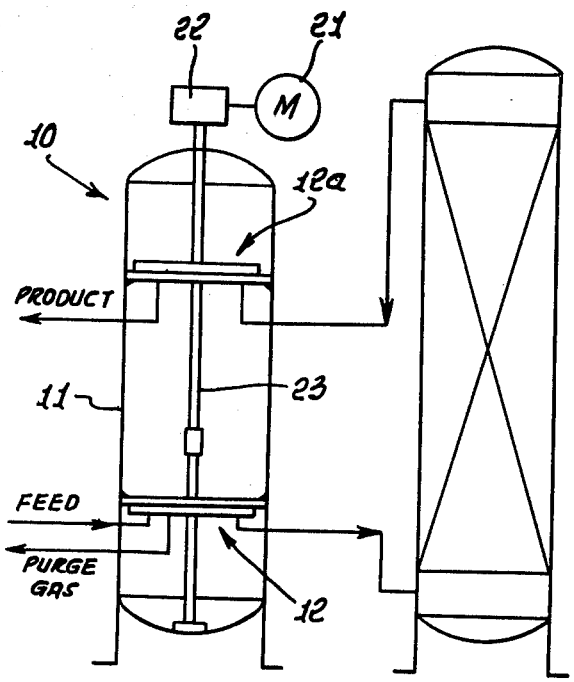
FIG. 1 is a side elevation schematically showing apparatus incorporating the invention.
Figure 2:
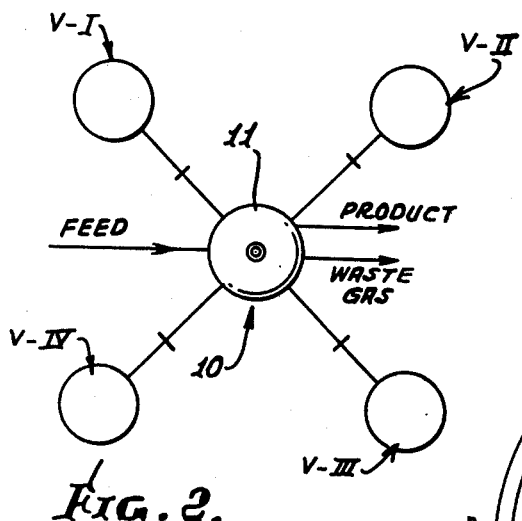
FIG. 2 is a plan view schematically showing similar apparatus incorporating the invention.

In FIGS. 1 and 2, a system 10 is shown for directing the flow of multiple gas streams between multiple adsorber vessels, as at V-I, V-II, V-III and V-IV.

The gas streams typically include the following:
 (i) feed gas,
 (ii) product gas,
 (iii) purge gas,
 (iv) repressurization gas,
and the vessels V-I–V-IV typically contain adsorbent material for a component or components of the feed gas other than the product gas.

Generally speaking, the system includes a control vessel 11 containing structure 12 including rotor means 12a defining gas passages communicable with control vessel ports for the (i)–(iv) gases, those ports being respectively indicated for example at 13–16 in FIGS. 3 and 4; also, those ports are selectively communicable (via the rotor means) with inlet and outlet ports (as at 17 and 17a, 18 and 18a, 19 and 19a, and 20 and 20a) that communicate with the adsorber vessels V-I–V-IV. Further, means is provided (as may for example include motor 21 driving gear box 22 which in turn drives rotor shaft 23) to rotate the rotor means so as communicate the gas passages in the structure and rotor means successively with the vessels V-I–V-IV, whereby:
 (v) feed gas is passed from the rotor means successively to the vessels;
 (vi) product gas is received by the rotor means successively from the vessels;
 (vii) purge gas is received by the rotor means successively from the vessels; and
 (viii) re-pressurization gas is passed from the rotor means successively to the vessels.

In this regard, the feed gas may typically consists of hydrogen rich gas containing impurities; the product gas then consists of hydrogen; the purge gas consists of hydrogen plus impurities purged from the adsorbers or adsorbers; and the re-pressurization gas consists of hydrogen.

More specifically, the structure 12 and rotor means 12a include primary relatively rotatable members 32 and 33, which may be disc shaped as shown, and secondary relatively rotatable members 30 and 31 which may also be disc shaped, as shown. Shaft 23 is shown as connected with disc members 30 and 32 to rotate same relative to disc members 31 and 33, members 30 and 31 typically having sealing face-to-face interengagement at 34, and members 32 and 33 typically having sealing face-to-face interengagement at 35. Gas flow control passages in such members are generally indicated in FIG. 3 at 30a, 31a, 32a and 33a. Non-rotary flow control structure (as for example piping) in the vessel, communicating with certain of such passages is indicated generally at 36 and 37; and rotary flow control structure (as for example piping) in the vessel, communicating with others of such passages is indicated generally at 38.

Discs 30 and 32 may be made slidable along the shaft (as by having polygonal coupling to the shaft) and means is provided to resiliently urge the discs 30 and 32 toward discs 31 and 33, respectively, to establish face-to-face sealing. Such means may include thrust bearings 39 and 40, and springs urging the thrust bearings against the discs 30 and 32. If desired, gas pressure may be established in chambers 40 and 41, and bellows 42 and 43, and controlled as at 44 and 45 for controllable pressure exertion on discs 30 and 32, thereby to control the degree of pressurized face-to-face sealing at 34 and 35. Also, vessel interior 60 may be pressurized to prevent leakage of gas to the atmosphere and to reduce the pressure differential between the discs and the exterior.

Referring now to FIGS. 9a–12d, the following key to gas flow is provided;
 (1) product in from vessel (adsorption)
 (2) hydrogen in (re-pressurization)
 (3) pressure equalization (providing)
 (4) product out
 (5) pressure equalization
 (6) feed to vessel
 (7) purge gas from vessel (dump)
 (8) purge out
 (9) feed in (hydrogen rich gas)
 (10) provide purge
 (11) purge receiving
 (12) final re-pressurization
 ● gas in
 ○ gas out In FIGS. 9a–12d, the in-feed ⑨ via port 13 remains in communication with arcuate groove 50 in lower rotary disc 32, as via suitable piping inlets 13a–13d (at 90° intervals) in lower stationary disc 33. As disc 32 rotates, inlet 13a and groove 50 in registration therewith pass in-feed gas to vessel V-I in the positions of FIGS. 9a–9d (i.e. 0°, 22½°, 45°, and 67½° of rotation); inlet 13b and groove 50 then pass in-feed gas to vessel V-II in FIGS. 10a–10d; inlet 13c and groove 50 then pass in-feed gas to vessel V-III in FIGS. 11a–11d; and inlet 13d and groove 50 pass in-feed gas to vessel V-IV in FIGS. 12a–12d. Similarly, the "purge gas out" ⑧ port at 15 remains in communication with arcuate groove 51 in lower rotary disc 32, as via suitable piping outlets 15a–15d (at 90° intervals) in lower stationary disc 33 and communicating with out-port 15. Thus, as the lower disc is rotated, outlet 15a and groove 51 in registration therewith pass purge gas from vessel V-III to out-port 15 in the positions of FIGS. 12d, 9a, 9b and 9c; outlet 15b and groove 51 then pass purge gas from vessel V-IV to out-port 15 in the positions of FIGS. 9d, 10a, 10b and 10c; outlet 15c and groove 51 pass purge gas from vessel V-I to out-port in the positions of FIGS. 10d, 11a, 11b and 11c; and outlet 15d and groove 51 pass purge gas from vessel V-II to port 15 in the positions of FIGS. 10d, 11a, 11b and 11c.

Further, in FIGS. 9a–12d, the product out ④ via port 14 remains in communication with arcuate groove 52 in upper rotary disc 30, as via suitable piping outlets 14a–14d (at 90° intervals) in upper stationary disc 31 and communicating with outlet port 14. Thus, as the upper disc rotates, outlet 14a and groove 52 in registration therewith pass product from vessel V-I to product out-port 14 in the positions of FIGS. 9a–9d; outlet 14b and groove 52 then pass product from vessel V-II to out-port 14 in the positions of FIGS. 10a–10d; outlet 14c and groove 52 then pass product from vessel V-III to out-port 14 in the positions of FIGS. 11a–11d; and finally outlet 14d and groove 52 pass product gas from vessel V-IV to out-port 14 in the position of FIGS. 12a–12d. Similarly, in FIGS. 9a–9d the re-pressurization in-feed ② via port 16 is in variable communication with arcuate grooves 54, 55 and 56 in upper rotary disc 30, as via suitable piping inlets 16a, 16b, 16c, 16d and 16e, 16f, 16g and 16h in upper stationary disc 31. As disc 30 rotates, inlet 16a and groove 54 pass pressure equalization gas to vessel V-II in FIG. 9a, in FIG. 9b, inlet 16a passes purge gas to vessel V-III and inlet 16e passes re-pressurization gas to vessel V-II; in FIGS. 9c and 9d, inlet 16e passes re-pressurization gas to vessel V-II and inlet 16a passes pressurization equalization gas to vessel V-III.

Figure 10C:
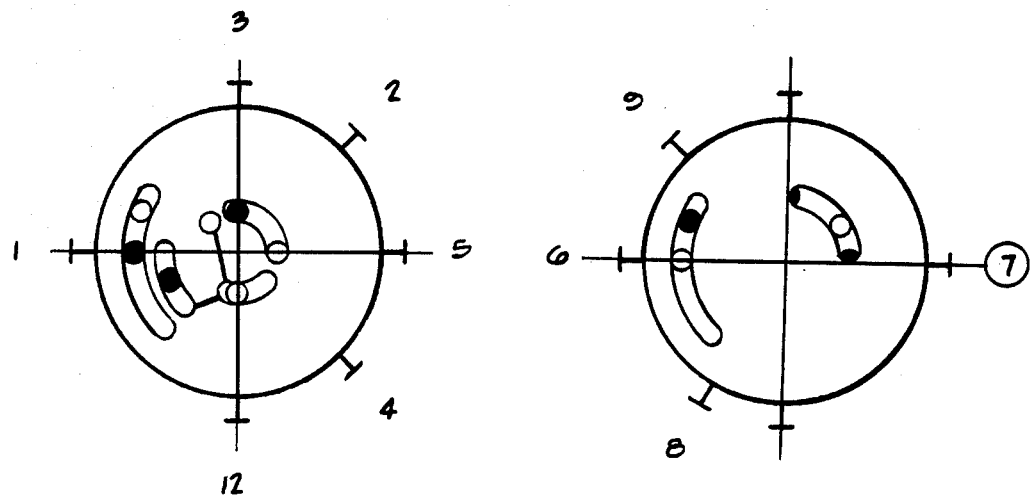
Figure 10D:
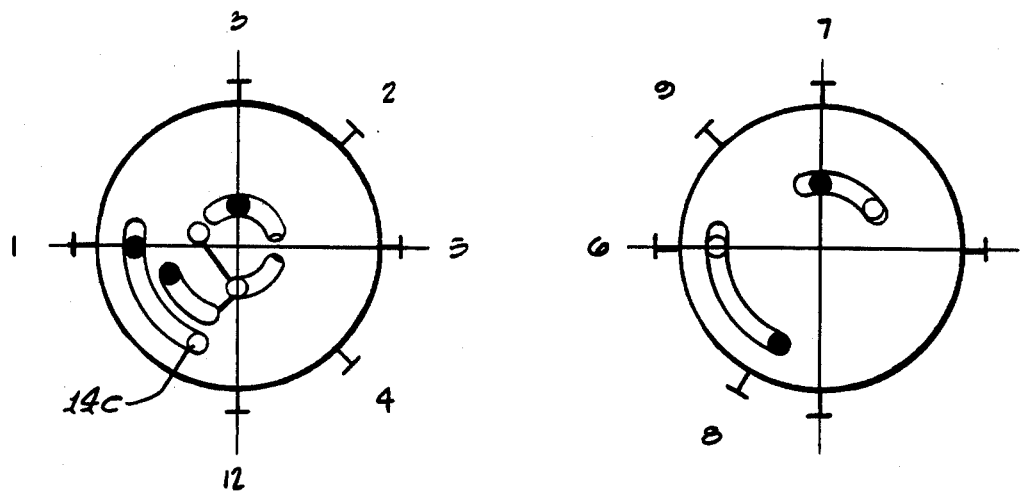
Figure 11C:
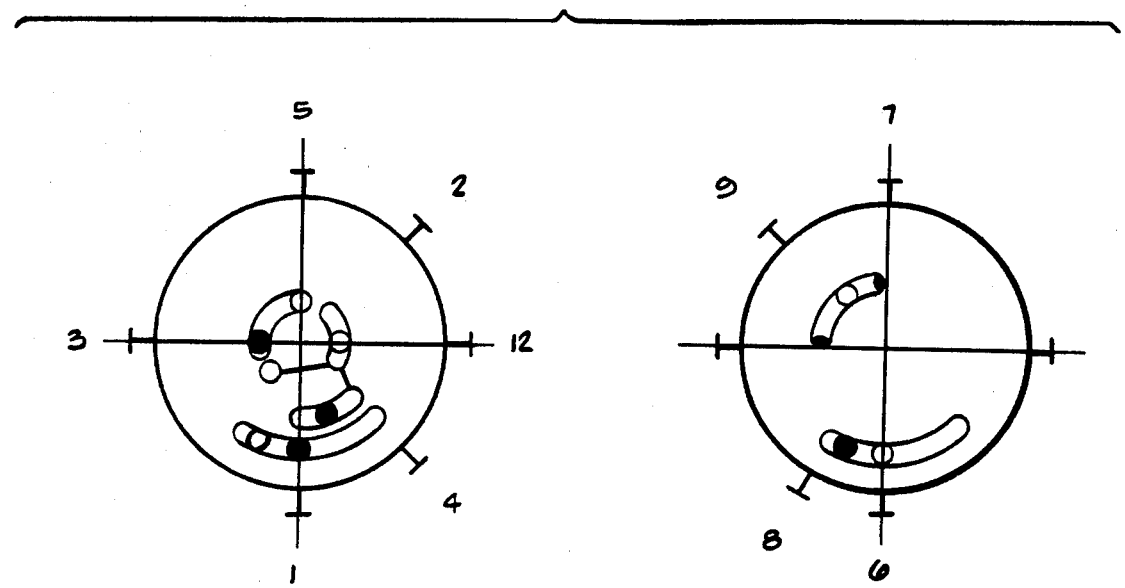
Figure 11D:
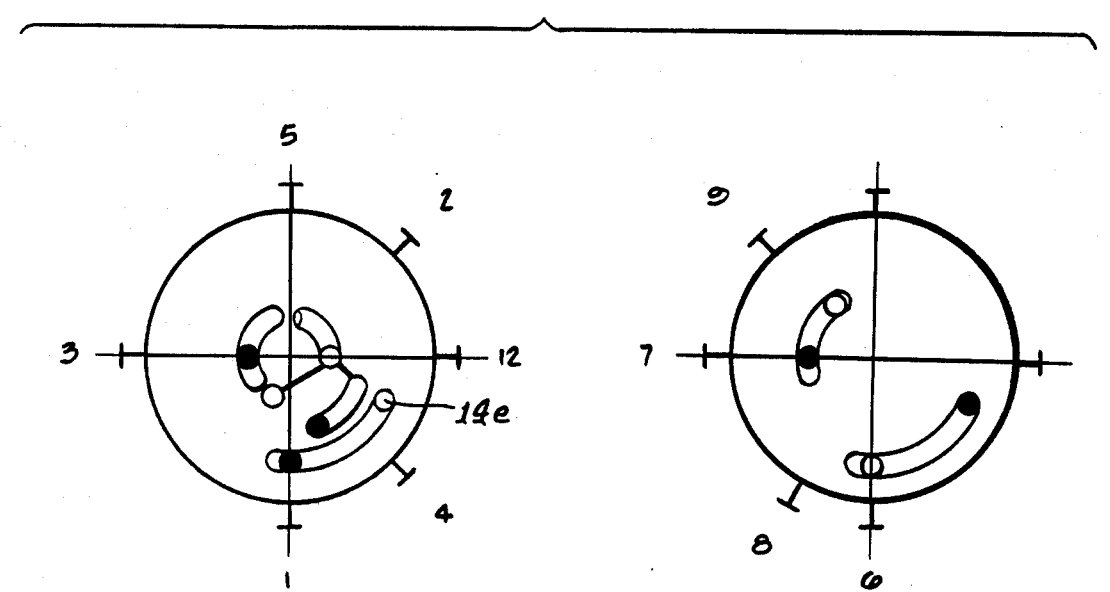
Figure 12A:
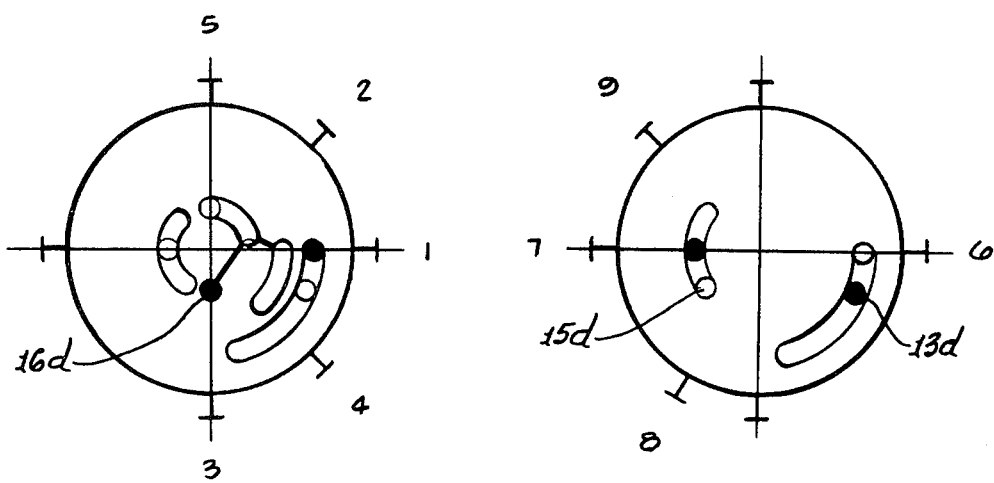
Figure 12B:
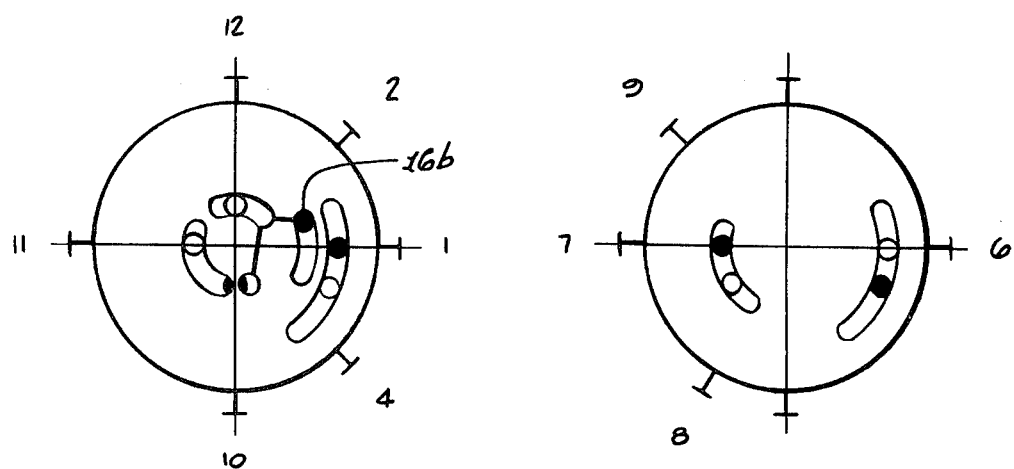
Figure 12C:
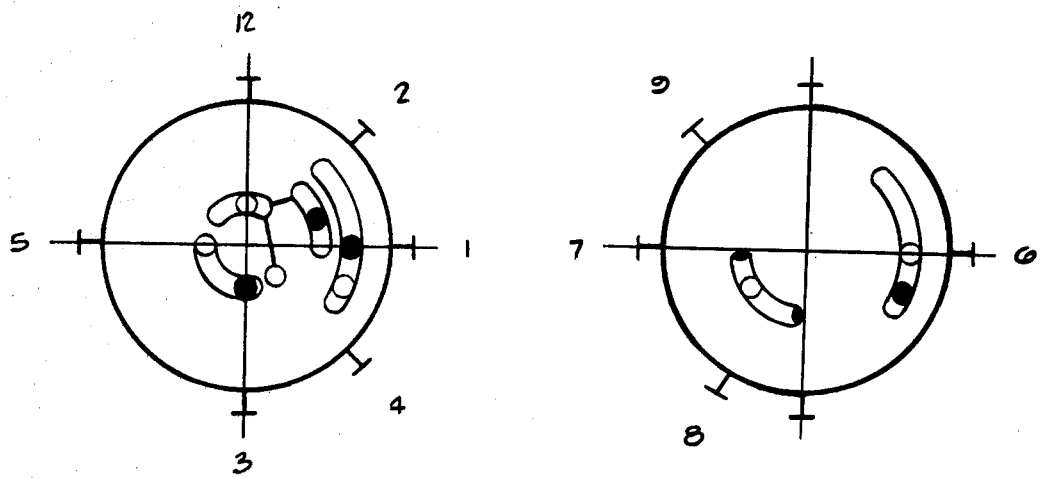
Figure 12D:
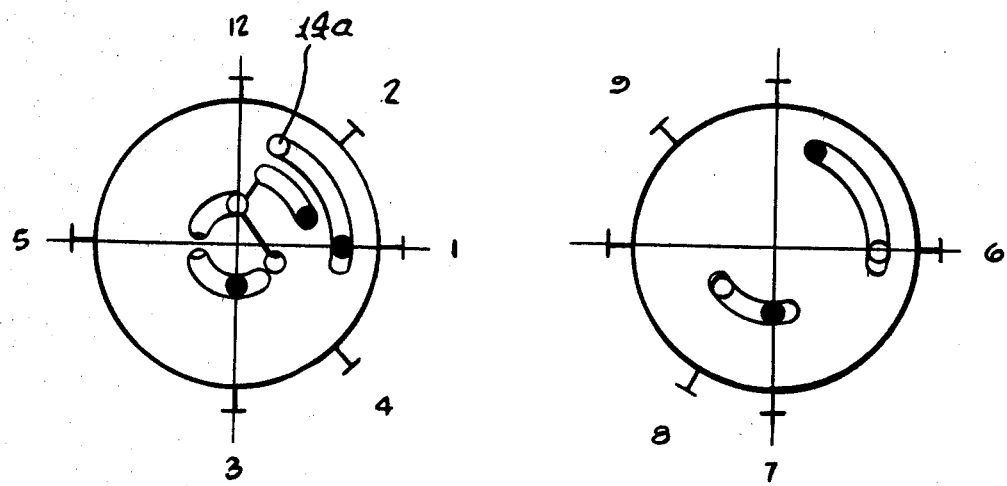

In FIG. 10a inlet 16b passes pressure equalization gas to vessel V-III; in FIG. 10b, inlet 16b passes purge gas to vessel V-IV and inlet 16f passes re-pressurization gas to vessel V-III; in FIGS. 10c and 10d inlet 16f passes re-pressurization gas to vessel V-III and inlet 16b passes pressurization equalization gas to vessel V-IV. These relationships recur in FIGS. 11a–11d, and in FIGS. 12a–12d, as shown.

The fixed piping required to communicate between ports 13–16 and the inlets and outlets 13a–13d; 14a–14d; 15a–15d; and 16a–16h is generally shown at 37 and 38, as referred to above, and also in FIGS. 5–8.

Typically, the discs may be rotated at a variable speed of between 1 and 20 revolutions every 20 minutes.

Suitable adsorbers in vessels I–IV are well known.

I claim:

1. In a system for directing the flows of the following gases:
    (i) feed gas
    (ii) product gas
    (iii) purge gas
    (iv) re-pressurization gas
between multiple vessels V-I, V-II, V-III and V-IV containing absorbent material for components of the feed other than the product gas, the improvement comprising
    (a) a control vessel containing structure including rotor means defining gas passages communicable with control vessel ports for the (i)–(iv) gases and selectively communicable with vessel inlet and outlet ports that communicate with the vessels V-I–V-IV,
    (b) means to rotate said rotor means about an axis to communicate the gas passages in said structure and rotor means successively with the vessels so that feed gas is passed from the rotor means successively to said vessels, product gas is received by the rotor means successively from the vessels, purge gas is received by the rotor means successively from the vessels, and re-pressurization gas is passed from the rotor means successively to said vessels,
    (c) said structure and rotor means including primary relatively rotatable members and containing passages to control the flow of said (i) and (iii) gases, and secondary relatively rotatable members containing passages to control the flow of said (ii) and (iv) gases, said primary members axially separated from said secondary members by space formed therebetween, and there being piping in the space between said pairs of members and communicating with said inlet and outlet ports.

2. The system of claim 1 wherein said primary members comprise relatively rotatable discs.

3. The system of claim 1 wherein said secondary members comprise relatively rotatable discs.

4. The system of claim 1 wherein said primary members comprise a fixed disc and a rotary disc in face-to-face sliding engagement, and the passages in said discs always in communication with the control vessel ports for said (ii) and (iv) gases.

5. The system of claim 4 wherein the passages in said discs are in selective communication with vessel inlet and outlet ports that communicate with the vessels V-I–V-IV.

6. The system of claim 1 wherein said primary members comprise a first fixed disc and first rotary disc in face-to-face sliding engagement, and the passages in said first discs always in communication with the control vessel ports for said (i) and (iii) gases; and said secondary members comprise a second fixed disc and a second rotary disc in face-to-face sliding engagement, and the passages in said second discs always in communication with the control vessel ports for said (ii) and (iv) gases, and said means to rotate the rotor means comprises a drive connected with the first and second rotary discs to simultaneously rotate them.

7. The system of claim 6 including means to control pressurized face-to-face sealing engagement of said discs.

8. The system of claim 6 wherein said passages communicate with said first and second fixed discs at quadrant locations about an axis of rotation defined by said discs.

9. The system of claim 8 wherein said passages in said first rotary disc include two arcuate grooves extending about said axis.

10. The system of claim 9 wherein said passages in said second rotary disc include four arcuate grooves extending about said axis, each groove in said first and second rotary discs extending less than about 90° about said axis, the fixed discs each containing four ports spaced about said axis to successively communicate with an arcuate grooves in the rotary disc associated with said fixed discs.

11. The system of claim 1 wherein said feed gas consists of hydrogen containing impurities, and said product gas consists of purified hydrogen.

* * * * *